(12) United States Patent
Li et al.

(10) Patent No.: US 11,127,126 B2
(45) Date of Patent: Sep. 21, 2021

(54) IMAGE PROCESSING METHOD, IMAGE PROCESSING DEVICE, IMAGE PROCESSING SYSTEM AND MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xi Li, Beijing (CN); Hao Zhang, Beijing (CN); Lili Chen, Beijing (CN); Yukun Sun, Beijing (CN); Jinghua Miao, Beijing (CN); Xuefeng Wang, Beijing (CN); Jinbao Peng, Beijing (CN); Bin Zhao, Beijing (CN); Jianwen Suo, Beijing (CN); Lixin Wang, Beijing (CN); Qingwen Fan, Beijing (CN); Wenyu Li, Beijing (CN); Yuanjie Lu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 83 days.

(21) Appl. No.: 16/500,538

(22) PCT Filed: Mar. 13, 2019

(86) PCT No.: PCT/CN2019/078014
§ 371 (c)(1),
(2) Date: Oct. 3, 2019

(87) PCT Pub. No.: WO2019/179342
PCT Pub. Date: Sep. 26, 2019

(65) Prior Publication Data
US 2021/0118109 A1 Apr. 22, 2021

(30) Foreign Application Priority Data

Mar. 19, 2018 (CN) .......................... 201810225841.0

(51) Int. Cl.
*G06T 5/50* (2006.01)
*G06T 7/11* (2017.01)
(Continued)

(52) U.S. Cl.
CPC .............. *G06T 5/50* (2013.01); *G06T 3/4053* (2013.01); *G06T 5/006* (2013.01); *G06T 7/11* (2017.01); *G06T 2207/20021* (2013.01)

(58) Field of Classification Search
None
See application file for complete search history.

(56) References Cited

U.S. PATENT DOCUMENTS 10,638,030 B1 * 4/2020 Sinharoy .............. H04N 13/207
2006/0133693 A1 * 6/2006 Hunt ...................... G06T 3/606
382/293

(Continued)

FOREIGN PATENT DOCUMENTS

CN 103747236 A 4/2014
CN 105812777 A 7/2016
CN 107622474 A 1/2018

*Primary Examiner* — James A Thompson
(74) *Attorney, Agent, or Firm* — Dilworth & Barrese, LLP.; Michael J. Musella, Esq.

(57) ABSTRACT

Disclosed is an image processing method, including: determining coordinate values of one or more target pixels in an image, wherein the target pixels are used for dividing the image; carrying out a mapping operation on the coordinate values of the one or more target pixels to obtain first pixel data; reading the image to obtain second pixel data; and combining the first pixel data and the second pixel data to obtain a combined image.

20 Claims, 4 Drawing Sheets

(51) Int. Cl.
  *G06T 3/40*  (2006.01)
  *G06T 5/00*  (2006.01)

(56) References Cited

U.S. PATENT DOCUMENTS

| | | | |
|---|---|---|---|
| 2014/0267602 A1 | 9/2014 | Tzur et al. | |
| 2016/0366365 A1* | 12/2016 | Iyer | H04N 7/0117 |
| 2018/0025520 A1 | 1/2018 | Huang et al. | |
| 2018/0095533 A1* | 4/2018 | Song | H04N 5/23238 |
| 2018/0314066 A1* | 11/2018 | Bell | G09G 5/10 |
| 2019/0333480 A1* | 10/2019 | Lang | G02B 27/017 |

* cited by examiner

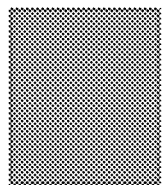 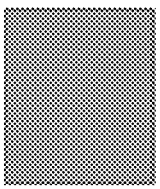 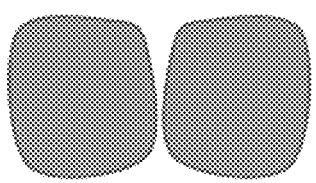 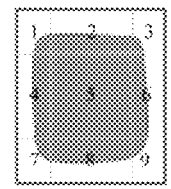 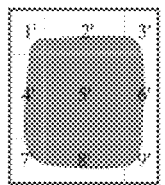
Fig. 3A　　　　　　Fig. 3B　　　　　　Fig. 3C
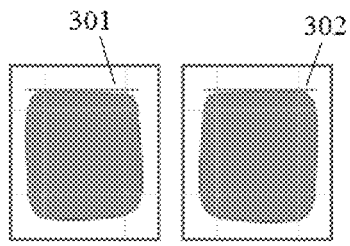 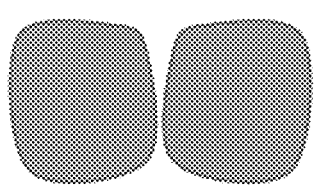 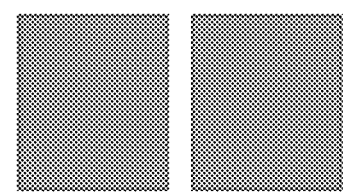
Fig. 3D　　　　　　Fig. 3E　　　　　　Fig. 3F
determining a transformation parameter for the mapping operation —— S401
as for a coordinate value of each of coordinates of the one or more target pixel, transforming the coordinate value into a value within the pixel value range of the image based on the transformation parameter —— S402
Fig. 4

IMAGE PROCESSING METHOD, IMAGE PROCESSING DEVICE, IMAGE PROCESSING SYSTEM AND MEDIUM

CROSS-REFERENCE TO RELATED APPLICATION

The present application claims the priority of a Chinese patent application No. 201810225841.0 filed on Mar. 19, 2018. Herein, the content disclosed by the Chinese patent application is incorporated in full by reference as a part of the present application.

TECHNICAL FIELD

The present disclosure relates to a field of image processing, and in particular to an image processing method, an image processing apparatus, and an image processing system and medium used for virtual reality image displaying.

BACKGROUND

At present, the requirement for image display resolution becomes higher and higher in the application of virtual reality, and the development of rendering technology of fixation point allows to save lots of calculation processes by utilizing perception knowledge of human beings. In a full-rendering scenario, most of calculation processes are actually wasted, because human eyes may only take in details in the center of the fixation point. Since concentration of cone cells on the retina being responsible for observing colors and details is different, clarity of anything beyond 5° of a fixation field of human eyes would reduce gradually.

SUMMARY

According to an aspect of the present disclosure, there is provided An image processing method, including: determining a coordinate value of one or more target pixels in an image, wherein the target pixel is used to segment the image; performing a mapping operation on the coordinate value of the one or more target pixels to obtain first pixel data; obtaining pixel data of the image as second pixel data; synthesizing the first pixel data and the second pixel data to obtain a synthetic image.

According to some embodiments of the present disclosure, determining a coordinate value of one or more target pixels in an image comprises: obtaining a fixation point coordinate value of a user according to an eyeball tracking algorithm; determining a boundary of a fixation point area corresponding to the fixation point coordinate value in the image according to the fixation point coordinate value; and determining the coordinate value of the target pixel based on the boundary of the fixation point area.

According to some embodiments of the present disclosure, performing a mapping operation on the coordinate value of the one or more target pixels to obtain first pixel data comprises: determining a transformation parameter used for the mapping operation; as for a coordinate value of each of the one or more target pixels, transforming the coordinate value into a value within a pixel value scope of the image based on the transformation parameter, to obtain the first pixel data, wherein the first pixel data comprises a quotient obtained by dividing the coordinate value by the transformation parameter and a remainder obtained by dividing the coordinate value by the transformation parameter.

According to some embodiments of the present disclosure, the image processing method further comprises: using two adjacent pixel values to represent the first pixel data, wherein the two adjacent pixel values comprise a first pixel value and a second pixel value, wherein taking the quotient obtained by dividing the coordinate value by the transformation parameter as the first pixel value of the two adjacent pixel values; taking the remainder obtained by dividing the coordinate value by the transformation parameter as the second pixel value of the two adjacent pixel values.

According to some embodiments of the present disclosure, synthesizing the first pixel data and the second pixel data to obtain a synthetic image comprises: establishing a new image; writing the first pixel data into the new image; writing the second pixel data after the first pixel data; taking the new image into which data is written as the synthetic image.

According to some embodiments of the present disclosure, the image processing method further comprises: determining optical parameters of a display apparatus used for displaying the image before determining the coordinate value of the one or more target pixels; performing an anti-distortion operation on the image based on the optical parameters of the display apparatus.

According to some embodiments of the present disclosure, the anti-distortion operation comprises: determining an anti-distortion grid according to the optical parameters of the display apparatus; generating an anti-distortion image based on the anti-distortion grid.

According to some embodiments of the present disclosure, the image processing method further comprises: segmenting the image into a plurality of sub-images based on the coordinate value of one or more target pixels in the image, and adjusting a resolution of at least one sub-image of the plurality of sub-images, so that the resolution of at least one sub-image of the plurality of sub-images is higher than a resolution of other sub-images.

According to some embodiments of the present disclosure, the image processing method further comprises: transmitting the synthetic image to a driving unit of the display apparatus, wherein first pixel data in the synthetic image is read by the driving unit, an inverse mapping operation is performed on the first pixel data to obtain the coordinate value of the one or more target pixels, and the coordinate value is used to segment the image into a plurality of sub-images which are drove and displayed respectively.

According to another aspect of the present disclosure, there is provided an image processing apparatus, comprising: a determining unit, configured to determine a coordinate value of one or more target pixels in an image, wherein the target pixel is used to segment the image; a transforming unit, configured to perform a mapping operation on the coordinate value of the one or more target pixels determined by the determining unit to obtain first pixel data; an obtaining unit, configured to obtain pixel data of the image as second pixel data; and a synthesizing unit, configured to synthesize the first pixel data obtained by the transforming unit and the second pixel data obtained by the obtaining unit to obtain a synthetic image.

According to some embodiments of the present disclosure, the determining unit obtains a fixation point coordinate value of a user according to an eyeball tracking algorithm; determines a boundary of a fixation point area corresponding to the fixation point coordinate value in the image according to the fixation point coordinate value; and determines the coordinate value of the target pixel based on the boundary of the fixation point area.

According to some embodiments of the present disclosure, the transforming unit determines a transformation parameter used for the mapping operation; as for each of coordinate values of the one or more target pixels, transforms the coordinate value into a value within a pixel value scope of the image based on the transformation parameter, to obtain the first pixel data, wherein the first pixel data comprises a quotient obtained by dividing the coordinate value by the transformation parameter and a remainder obtained by dividing the coordinate value by the transformation parameter.

According to some embodiments of the present disclosure, the transforming unit is further configured to use two adjacent pixel values to represent the first pixel data, wherein the two adjacent pixel values comprise a first pixel value and a second pixel value, wherein the quotient obtained by dividing the coordinate value by the transformation parameter is taken as the first pixel value of the two adjacent pixel values; the remainder obtained by dividing the coordinate value by the transformation parameter is taken as the second pixel value of the two adjacent pixel values.

According to some embodiments of the present disclosure, the synthesizing unit is configured to establish a new image; write the first pixel data into the new image; write the second pixel data after the first pixel data; and take the new image into which data is written as the synthetic image.

According to some embodiments of the present disclosure, the image processing apparatus further comprises: an anti-distortion unit, configured to determine optical parameters of a display apparatus used for displaying the image before determining the coordinate value of the one or more target pixels, and perform an anti-distortion operation on the image based on the optical parameters of the display apparatus.

According to some embodiments of the present disclosure, the anti-distortion unit is configured to determine an anti-distortion grid according to the optical parameters of the display apparatuses; and generate an anti-distortion image based on the anti-distortion grid.

According to some embodiments of the present disclosure, the image processing apparatus further comprises: a multi-resolution rendering unit, configured to segment the image into a plurality of sub-images according to the target pixels, and adjust a resolution of at least one sub-image of the plurality of sub-images, so that the resolution of at least one sub-image of the plurality of sub-images is higher than a resolution of other sub-images.

According to some embodiments of the present disclosure, the image processing apparatus further comprises: a transmitting unit, configured to transmit the synthetic image to a driving unit of the display apparatus, wherein first pixel data in the synthetic image is read by the driving unit, an inverse mapping operation is performed on the first pixel data to obtain the coordinate value of the one or more target pixels, and the coordinate value is used to segment the image into a plurality of sub-images which are drove and displayed respectively.

According to another aspect of the present disclosure, there is provided a computer readable medium, upon which computer readable instructions are stored, wherein the image processing method mentioned above is executed when the computer readable instructions are executed by a computer.

According to another aspect of the present disclosure, there is provided an image processing system. The system comprises: an image acquisition apparatus, configured to acquire an image; an image display apparatus, comprising a driving unit; and an image processing apparatus, wherein, the image processing apparatus includes: a receiving unit, configured to receive the image from the image acquisition apparatus; a determining unit, configured to determine a coordinate value of one or more target pixels in the image, wherein the target pixel is used to segment the image; a transformation unit, configured to perform a mapping operation on the coordinate value of the one or more target pixels to obtain first pixel data; an obtaining unit, configured to obtain pixel data of the image as second pixel data; a synthesizing unit, configured to synthesize the first pixel data and the second pixel data to obtain a synthetic image; and a transmitting unit, configured to transmit the synthetic image to the image display apparatus, wherein the first pixel data in the synthetic image is read by the driving unit, an inverse mapping operation is performed on the first pixel data to obtain the coordinate value of the one or more target pixels, and the coordinate value is used to segment the image into a plurality of sub-images which are drove and displayed respectively.

BRIEF DESCRIPTION OF THE DRAWINGS

In order to describe technical solutions of embodiments of the present disclosure more clearly, accompanying figures that need to be used in description of the embodiments will be introduced briefly. Obviously, the figures in the following description are just some embodiments of the present disclosure. For those ordinary skilled in the art, other figures can also be obtained from these figures, without paying any inventive labor. The following figures are not purposely drawn by scaling in proportion according to the actual dimensions, because the key point is to show the substance and spirit of the present disclosure.

FIG. 3A shows a schematic diagram of original image data acquired by an image acquisition apparatus;

FIG. 3B shows a schematic diagram of image data after anti-distortion processing is performed;

FIG. 3C shows a schematic diagram of image data after multi-resolution rendering is performed;

FIG. 3D shows a schematic diagram of a synthetic image including coordinate data of a target pixel and image data to be displayed;

FIG. 3E shows a schematic diagram of an image displayed in an image display apparatus;

FIG. 3F shows a schematic diagram of an image viewed by a user through a display device;

FIG. 4 shows a flow diagram of a mapping operation according to an embodiment of the present disclosure;

DETAILED DESCRIPTION

Figure 1A:
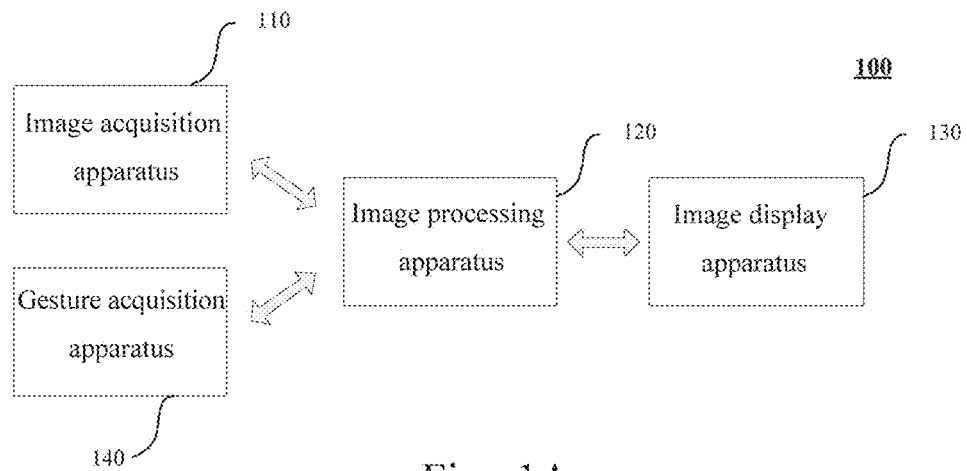
FIG. 1A shows a schematic block diagram of an image processing system according to an embodiment of the present disclosure.

Technical solutions in embodiments of the present disclosure will be described below clearly and completely by combining with accompanying figures. Obviously, the embodiments described below are just a part of embodiments of the present disclosure, but not all the embodiments. Based on the embodiments of the present disclosure, all the other embodiments obtained by those ordinary skilled in the art without paying any inventive labor also fall into the scope sought for protection in the present disclosure.

"First", "second" and similar words used in the present disclosure do not indicate any sequence, quantity or importance, but they are just used to distinguish different components. Also, "include", "comprise" and other similar words mean that an element or an object appearing prior to the word contains an element or an object or its equivalent listed subsequent to the word, but does not exclude other elements or objects. "Connect", "connected to" and other similar words are not limited to physical or mechanical connection, but may comprise electrical connection, regardless of direct connection or indirect connection. "Up", "down", "left", "right" and so on are used to indicate only a relative position relationship. After an absolute position of a described object is changed, the relative position relationship is likely to be changed correspondingly.

As disclosed in the specification and Claims of the present disclosure, unless otherwise explicitly indicating an exception in the context, words of "a", "one", "a kind of" and/or "the" and so on do not specifically refer to a singular number particularly, but may also comprise a complex number. Generally speaking, terms of "include" and "comprise" only indicate to comprise those explicitly identified elements and steps, while these steps and elements do not form an exclusive list, and a method or a device is also likely to comprise other steps or elements.

Although the present disclosure makes various references to certain modules in a system according to an embodiment of the present disclosure, any quantity of different modules may be used and ran on a user terminal and/or a server. The modules are just for illustration, and different aspects of the system and method may use different modules.

Flow diagrams are used in the present disclosure to describe operations executed by the system according to the embodiment of the present disclosure. It shall be understood that previous or subsequent operations are not necessarily executed in sequence accurately. On the contrary, various steps may be performed in a reversed sequence or processed simultaneously. At the same time, other operations may also be added to these processes, or one or several operations may be removed from these processes.

The present disclosure provides an image processing method, which realizes simultaneous transmission of coordinate data of a target pixel and image data in an image by performing a mapping operation on a coordinate value of the target pixel in the image.

FIG. 1A shows a schematic block diagram of an image processing system according to an embodiment of the present disclosure. As show in FIG. 1A, an image processing system 100 may comprise an image acquisition apparatus 110, an image processing apparatus 120 and an image display apparatus 130. In the following text, the image processing system 100 may also be referred to as a system 100.

The image acquisition apparatus 110 may be configured to acquire image data. In some embodiments, the image acquisition apparatus 110 may comprise one or more devices that may be used for image acquisition, such as a camera, a video camera, etc. For example, the image acquisition apparatus 110 may be configured to comprise one acquisition device, configured to acquire an image for flat panel display. For another example, the image acquisition device 110 may also be configured to comprise at least two image acquisition devices, configured to acquire an image for left eye display and an image for right eye display respectively, so as to realize displaying a stereoscopic image.

When the system 100 is configured to display a stereoscopic image (such as virtual reality VR, augmented reality AR, etc.), in some embodiments, the system 100 further comprises a gesture acquisition apparatus 140 configured to acquire a user observation gesture. For example, the gesture acquisition apparatus 140 may comprise a gyroscope, an acceleration meter and/or a geomagnetic sensor, etc. Data of the gesture used for the stereoscopic image of the image display apparatus may be obtained by utilizing the gesture acquisition apparatus 140. For example, when the user views the stereoscopic image via a device such as a mobile phone, smart glasses, an intelligent helmet, etc., the gesture acquisition apparatus 140 may be disposed in the mobile phone, the smart glasses, or the intelligent helmet used for viewing the image.

The image processing apparatus 120 may be configured to receive image data acquired by the image acquisition apparatus 110 and gesture data acquired by the gesture acquisition apparatus 140, and perform the image processing method as described below on received image data. In some embodiments, the image processing apparatus 120 may obtain a gesture Euler angle for the image display apparatus by utilizing gesture data acquired by the gesture acquisition apparatus, and generate image rendering data used for left eye and right eye of the user in this gesture respectively according to the image data acquired by the image acquisition apparatus 110.

In some embodiments, the image processing apparatus 120 may perform an anti-distortion operation on the received image data to offset distortion that would be caused upon imaging via an optical element in the image display apparatus 130, so as to reduce image distortion possibly observed by the user when the user views a displayed image via an optical element.

In some embodiments, the image processing apparatus 120 may perform a multi-resolution rendering operation on a received image or an anti-distortion image, so as to generate an image to be displayed in the image display apparatus 130. For example, the image processing apparatus 120 may obtain a coordinate value of a fixation point of the user according to an eyeball tracking algorithm, and obtain a coordinate value of a target pixel used for segmenting the image according to the coordinate value of the fixation point. After that, the image processing apparatus 120 may segment the image into a plurality of sub-images according to the coordinate value of the target pixel, and adjust a resolution of at least one sub-image of the plurality of sub-images, so that a resolution of a sub-image corresponding to the fixation point of the user is higher than a resolution of other sub-images.

In some embodiments, the image processing apparatus 120 may perform a mapping operation on the coordinate value of the target pixel. The coordinate value of the target pixel may be corresponding to a first data range, for example, it may range from (0, 0) to (4320, 4800), that is, the coordinate value may have a data value that falls into the first data range. The image pixel value may be corresponding to a second data range, for example, it may be (0, 225), that is, the image pixel value may have a data value that falls into the second data range. The mapping operation may realize transforming a data value corresponding to the first data range into a data value corresponding to a second data range, for example, it may be realized by a transformation parameter determined based on the first data range and the second data range.

Data obtained after the mapping operation is performed on the coordinate value of the target pixel may be referred to as first pixel data, and the first pixel data is corresponding to the second data range of the image pixel value, that is, it may realize that the coordinate data value of the target pixel corresponding to the first data range may be represented by utilizing the image pixel data value corresponding to the second data range.

Additionally, since the first pixel data obtained by having performed the mapping operation is corresponding to the second data range corresponding to the image pixel value, the image processing apparatus 120 may synthesize the first pixel data together with the second pixel data which is used for a displayed image and transmitted to the image display apparatus 130 as a synthetic image, and transmit the synthetic image to the image display apparatus 130 for analyzing and displaying. For example, first pixel data and second pixel data in the synthetic image may be separated from each other by analyzing, that is, the first pixel data representing the coordinate value of the target pixel is separated from the second pixel data of the image to be displayed.

The image processing apparatus 120 herein may be implemented as one or more specific-purpose or common-purpose computer system, for example, a personal computer, a notebook computer, a panel computer, a mobile phone, a personal digital assistance (PDA), smart glasses, a smart watch, an intelligent finger ring, an intelligent helmet or any intelligent portable device or wearable device. The image processing apparatus 120 may comprise a communication port with which a network realizing data communication is connected. The image processing apparatus 120 may further comprise at least one processor, configured to execute a program instruction. The image processing apparatus 120 may comprise one internal communication bus. The image processing apparatus 120 may comprise different forms of program storage units and data storage units, for example, hard disk, read only memory (ROM), random access memory (RAM), which is capable of being configured to store various data documents processed by the processor and/or used in communication, and possible program instructions executed by the processor. The image processing apparatus 120 may further comprise one input/output component, which supports input/output data stream between the image processing apparatus 120 and other components (such as a user interface). The image processing apparatus 120 may transmit and receive information and data from and to the network via communication port. For example, the image processing apparatus 120 may perform mutual data communication and transmission with the image acquisition apparatus 110, the image display apparatus 10 and the gesture acquisition apparatus 140.

The image display apparatus 130 may be configured to receive image data from the image processing apparatus 120. For example, the image display apparatus 130 may receive a synthetic image generated by the image processing apparatus 120, and analysis the synthetic image to obtain the coordinate value of the target pixel used for segmenting the image and the image data to be displayed, for example, the coordinate value of the target pixel may be obtained by performing an inverse mapping operation on the first pixel data. In some embodiments, the image display apparatus 130 may comprise a driving unit. The driving unit may be configured to analysis the image data to be displayed and obtain the coordinate value of the target pixel used for segmenting the image to be displayed. Based on the coordinate value of the target pixel obtained by analyzing, the driving unit may segment the image to be displayed, and the segmented images in different areas are stretched and displayed.

In some embodiments, the image display apparatus 130 may be a display, a pair of smart glasses, an intelligent helmet, etc.

In FIG. 1A, the image acquisition apparatus 110, the image processing apparatus 120, the image display apparatus 130 and the gesture acquisition apparatus 140 are presented as a separate module. Those skilled in the art may understand that the above apparatus modules may be implemented as a separate hardware device, or may be integrated into one or more hardware devices. Specific implementations of different hardware devices shall not be served as factors limiting the protection scope of the present disclosure as long as it is capable of realizing the principles described in the present disclosure.

Figure 1B:
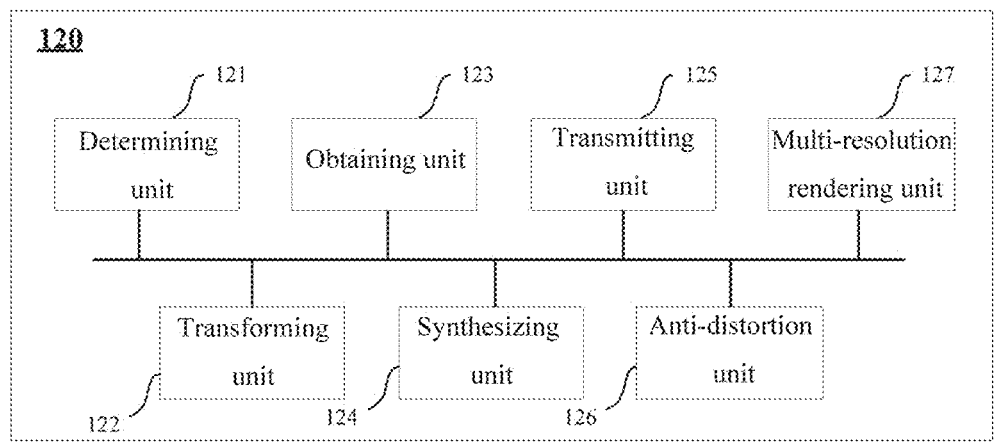
FIG. 1B shows a schematic block diagram of an image processing apparatus according to an embodiment of the present disclosure.

FIG. 1B shows a schematic block diagram of an image processing apparatus according to an embodiment of the present disclosure.

In some embodiments, the image processing apparatus 120 may comprise a determining unit 121, configured to determine a coordinate value of a target pixel for performing image segmentation on image rendering data used for left eye and right eye of the user respectively. For example, when the user uses a virtual reality device to view the image, the image processing apparatus 120 may obtain a fixation point coordinate value of the user according to an eyeball tracking algorithm. According to the obtained fixation point coordinate value of the user, the image processing apparatus 120 may determine a boundary of a fixation point area corresponding to the fixation point coordinate value in the image according to the fixation point coordinate value. After that, the image processing apparatus 120 may determine the coordinate value of the target pixel that performs image segmentation on the image data to be processed based on the boundary of the fixation point area. For example, the fixation point area rendered as high resolution can be determined according to the fixation point coordinate value. Herein, the coordinate value of the boundary points of the fixation point area are may be served as the coordinate value of the target pixel used for segmenting the image.

In some embodiments, the image processing apparatus may further comprise a transforming unit 122. For example, as described above, the image processing apparatus 120 may obtain the coordinate value of the target pixel, and performs a mapping operation on the coordinate value of the target pixel by utilizing the transforming unit 122, to map the coordinate value of the target pixel to the first pixel data.

Performing the mapping operation on coordinate values of one or more target pixels to obtain the first pixel data refers to convert the coordinate value data of the target pixel into the data represented by using the image pixel value data. In one embodiment according to the present disclosure, by taking an 4 k image as an example, in the 4 k image, the data of the coordinate value of the target pixel ranges between (0,0) and (4320,4800), while the data of the image pixel value generally ranges between (0, 255). Herein, it needs to convert the coordinate data value into a data interval corresponding to the image pixel value, and such conversion may be implemented by a transformation parameter. For example, the transformation parameter may be a certain value falling into (4800/255,255), for example, the transformation parameter may be 250. When one coordinate value of the target pixel is 4500, the mapping operation may be dividing the coordinate value 4500 by the transformation parameter 250, to obtain a quotient 18 and a remainder 0. Herein, the quotient and the remainder may be called as the first pixel data, and fall between the data range (0, 225) of the image pixel value. That is, it may realize that the coordinate data value of the target pixel may be represented by utilizing the first pixel data falling into the data range of the image pixel value.

In the synthetic image, a first pixel value of two adjacent pixel values may be used to represent a high pixel grayscale value after conversion of the coordinate, and a second pixel value thereof represents a low pixel grayscale value after conversion of coordinate. Herein, the high pixel grayscale value may be a quotient (for example, 18) obtained by dividing the coordinate value of the target pixel by the transformation parameter, and the low pixel grayscale value may be a remainder (for example, 0) obtained by dividing the coordinate value of the target pixel by the transformation parameter. In other embodiments according to the present disclosure, a plurality of pixel values may be used to represent one coordinate value.

By analogy, the coordinate value of the target pixel may be mapped to pixel data. When the coordinate value of the pixel is a two-dimensional form, wherein the coordinate value of each dimension may be mapped to the pixel data by adopting the mapping method as described above. When the coordinate value of the pixel has parameters of more dimensions, the same method may also be adopted to convert the coordinate value into the pixel data.

As described above, it needs to determine the transformation parameter when the coordinate value of the pixel is converted into the pixel data. The transformation parameter may be selected voluntarily according to the actual condition as long as it is capable of mapping the range of the coordinate value to the range of the image pixel value, for example, as long as it is capable of satisfying that the value of the quotient and remainder obtained by dividing the coordinate value by the transformation parameter, wherein the coordinate value falls into the range of the image pixel value. For example, when it needs to map the range of the coordinate value from (0, 0) to (4320, 4800) to the range of the pixel grayscale of (0, 255), the transformation parameter nay be any integer between (4800/255,255). For example, the transformation parameter may be 250, or may be any other number that meets the requirement and may be represented by using the pixel grayscale value.

Further, the image processing apparatus 120 may further comprise an obtaining unit 123, configured to obtain the pixel data of the image to be displayed as the second pixel data.

Further, the image processing apparatus 120 may further comprise a synthesizing unit 124, configured to synthesize the first pixel data and the second pixel data to obtain a synthetic image. Herein, the operation of synthesizing the first pixel data and the second pixel data to obtain a synthetic image may comprise: creating one image as the synthetic image, and writing the first pixel data into a first row of the synthetic image, and completing remaining pixels of a first row with zero. After that, the second pixel data is written into the synthetic image. Those skilled in the art may understand that the synthesizing method of the first pixel data and the second pixel data is not limited to the above example. According to the actual situation, the first pixel data and the second pixel data may be synthesized by using any combination manner. For example, the second pixel data may be firstly written, and then the first pixel data is written. For another example, specific data for identifying may be written prior to the first pixel data and/or between the first pixel data and the second pixel data, so that the image display apparatus may identify and distinguish the first pixel data and the second pixel data.

The image processing apparatus 120 may further comprise a transmitting unit 125, configured to transmit the synthetic image to the image display apparatus 130.

In some embodiments, the image processing apparatus 120 may further comprise an anti-distortion unit 126. The anti-distortion unit 126 may perform an anti-distortion operation on the image rendering data used for left eye and right eye of the user respectively according to the optical parameters of the image display apparatus. That is, drawing and texture mapping anti-distortion grids is performed according to the optical parameters and the screen coordinates of the image display device (such as a virtual reality display device), to obtain an anti-distorted image. When the image on which the anti-distortion processing is performed is displayed through a corresponding image display apparatus, the user may view an image almost without any distortion.

In some embodiments, the image processing apparatus 120 may further comprise a multi-resolution rendering unit 127, which may be configured to divide the anti-distortion image into a plurality of sub-images according to the target pixel, and adjust a resolution of at least one sub-image of the plurality of sub-images, so that the resolution of the center (or corresponding to the fixation point area of the user) of the image is higher than the resolution of other sub-images.

For example, when the fixation point of the user is located at the center of the image, it may be determined that the central area of the image is served as the fixation point area of the user. Herein, the fixation point area may be determined as a rectangle area. Furthermore, by utilizing four vertexes of the fixation point area of the rectangle, the image may be divided into nine areas. The multi-resolution rendering unit 127 may perform rendering with different resolutions on the nine divided image areas respectively. For example, the image area corresponding to the fixation point area may have a highest resolution. As for other image areas, a corresponding resolution may be determined according to a distance from the fixation point area. For example, when the distance from the image area to the fixation point area is farther, its resolution may be set as being lower.

By utilizing the image processing system provided in the embodiment of the present disclosure, synchronous transmission of the coordinate data and the image data may be realized, thereby improving efficiency in the process of image transmission; the anti-distortion operation may also be realized, thereby reducing image deformation when the user views the image; the multi-resolution rendering may be performed on the image data, thereby reducing the transmission pressure of the image data.

Figure 2:
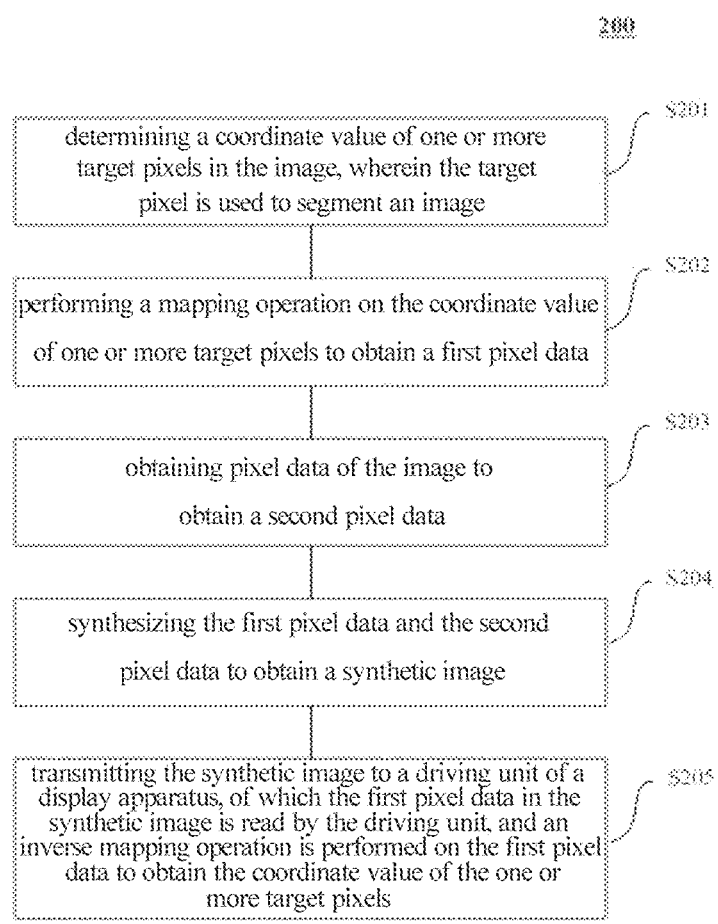
FIG. 2 shows an exemplary flow diagram of an image processing method according to an embodiment of the present disclosure.

FIG. 2 shows an exemplary flow diagram of an image processing method according to the embodiments of the present disclosure. As shown in FIG. 2, according to the image processing method 200, in step S201, a coordinate value of one or more target pixels in the image is determined, wherein the target pixel is used to segment an image. In step S202, a mapping operation is performed on the coordinate value of one or more target pixels to obtain a first pixel data. In step S203, the image is read to obtain a second pixel data. In step S204, the first pixel data and the second pixel data are synthesized to obtain a synthetic image. In step S205, the synthetic image is transmitted to a driving unit of a display apparatus, of which the first pixel data in the synthetic image is read by the driving unit, and an inverse mapping operation is performed on the first pixel data to obtain the coordinate value of the one or more target pixels, of which the coordinate value is used to segment the image into a plurality of sub-images which are drove and displayed respectively.

In some embodiments, in step S202, performing a mapping operation on the coordinate value of one or more target pixels to obtain the first pixel data refers to converting the coordinate value of the target pixel into data that may be represented by using the pixel data of the image.

FIG. 4 shows a flow diagram of a mapping operation according to an embodiment of the present disclosure. First, in step S401, a transformation parameter for the mapping operation is determined, for example, the transformation parameter may be determined based on a data range of coordinate value of the target pixel and a data range of the image pixel value.

Next, in step S402, as for a coordinate value of each of coordinates of the one or more target pixels, the coordinate value is transformed into a value within the range of the pixel value of the image based on the transformation parameter. Herein, the first pixel data comprises a quotient obtained by dividing the coordinate value by the transformation parameter and a remainder obtained by dividing the coordinate value by the transformation parameter.

For example, by taking a 4 k image as an example, the coordinate value of the pixel in the 4 k image ranges between (0, 0) and (4320, 4800), while a pixel grayscale value generally falls into (0, 255). It needs to convert the coordinate value into an interval corresponding to the pixel grayscale value.

In some embodiments, the first pixel data may be represented by using two adjacent two pixel values, that is, one coordinate value of the target pixel is represented by using two adjacent pixel values. A first pixel value of the two adjacent pixel values represents a high pixel grayscale value after the coordinate is converted, and a second pixel value thereof represents a low pixel grayscale value after the coordinate is converted. Herein, the high pixel grayscale value may be a quotient obtained by dividing the coordinate value of the target pixel by the transformation parameter, and the low pixel grayscale value may be a remainder obtained by dividing the coordinate value by the of the target pixel transformation parameter. According to other embodiments of the present disclosure, one coordinate value of the target value may be represented by using a plurality of pixel values.

By analogy, the coordinate value of the target pixel may be mapped as the pixel data. When the coordinate value of the pixel is a two-dimensional form, the coordinate value of each dimension may be mapped to the pixel data by adopting the mapping method as described above. When the coordinate value of the pixel has parameters of more dimensions, the coordinate value may also be converted into the pixel data by adopting the same method.

As described above, it needs to determine the transformation parameter when the coordinate value of the pixel is converted into the pixel data. The transformation parameter may be selected voluntarily according to the actual condition as long as it is capable of mapping the range of the coordinate value to the range of the image pixel value, that is, as long as it is capable of satisfying that the value of the quotient and remainder obtained by dividing the coordinate value by the transformation parameter, wherein the coordinate value falls into the range of the pixel grayscale value. For example, when it needs to map the range of the coordinate value from (0, 0) to (4320, 4800) to the range of (0, 255), the transformation parameter nay be any integer between (4800/255,255).

In some embodiments, in step S204, synthesizing the first pixel data and the second pixel data to obtain a synthetic image comprises: establishing a new image; writing the first pixel data into a first row of the new image; writing the second pixel data after the first pixel data; taking the new image into which data is written as a synthetic image; for example, writing the first pixel data into a first row of the synthetic image, and completing a remaining pixel bits of the first row by zero; after that, writing the second pixel data into the synthetic image. Those skilled in the art may understand that the method for synthesizing the first pixel data and the second pixel data is not limited to the above example. According to the actual situation, the first pixel data and the second pixel data may be synthesized by using any combination method. For example, the second pixel data may be firstly written, and then the first pixel data is written. For another example, specific data for identifying may be written prior to the first pixel data and/or written between the first pixel data and the second pixel data, so that the image display apparatus may identify the first pixel data and the second pixel data and distinguish the first pixel data from the second pixel data.

In some embodiments, the image processing method 200 may further comprise: determining optical parameters of a display apparatus for displaying an image before determining a coordinate value of one or more target pixels; performing an anti-distortion operation on the image based on the optical parameters of the display apparatus.

Herein, the anti-distortion operation may comprise: determining an anti-distortion grid according to the optical parameters of the image display apparatus, and mapping texture of the image onto the anti-distortion grid according to the coordinate of the image.

For example, the anti-distortion operation may comprise establishing a vertex array, a triangular array and an image UV coordinate array according to image data acquired by the image acquisition device. Coordinate transformation may be performed on a coordinate of original image data according to the optical parameters of the image display device, and a grid generated by the anti-distortion operation is drawn according to the coordinate transformation. After the grid generated by the anti-distortion operation is determined, the image texture may be mapped onto the generated gird, so that an anti-distortion image on which the anti-distortion operation is performed is generated.

Returning to FIG. 2, in some embodiments, the image processing method 200 may further comprise dividing the anti-distortion image on which the anti-distortion operation is performed into a plurality of sub-images according to the coordinate of target pixel, and adjusting a resolution of at least one sub-image of the plurality of sub-images, for example, making a resolution at the center of the image be higher than a resolution around the image. A process of multi-resolution rendering would be described below with reference to FIG. 3C.

FIGS. 3A-3F show schematic diagrams of an image processing flow executed by the image processing system according to the embodiment of the present disclosure.

FIG. 3A shows a schematic diagram of original image data obtained by the image acquisition apparatus. Herein, the original image data may be image data directly acquired by the image acquisition apparatus, or may be image data obtained by the image processing apparatus from the gesture data as described above.

FIG. 3B shows a schematic diagram of image data after the anti-distortion process is performed. Herein, the anti-distortion operation is determined according to the optical parameters of the corresponding display device. That is to say, the parameter of the anti-operation operation may be different with respect to different display devices. After the anti-distortion operation is performed, the image data (anti-distortion image) is converted into the image with distortion as shown in FIG. 3B.

FIG. 3C shows a schematic diagram of image data after multi-resolution rendering is performed. After the anti-distortion operation is performed, the system 100 may further obtain a fixation point coordinate value of the user according to the eyeball tracking algorithm, and perform the multi-resolution rendering operation on the anti-distortion image according to the fixation point coordinate value.

Based on the image processing method according to the embodiments of the present disclosure, a coordinate value of one or more target pixels in the image may be determined according to a determined fixation point coordinate value, of which target pixel is used to segment the anti-distortion image, so as to be used for performing the multi-resolution rendering operation.

Figure 5:
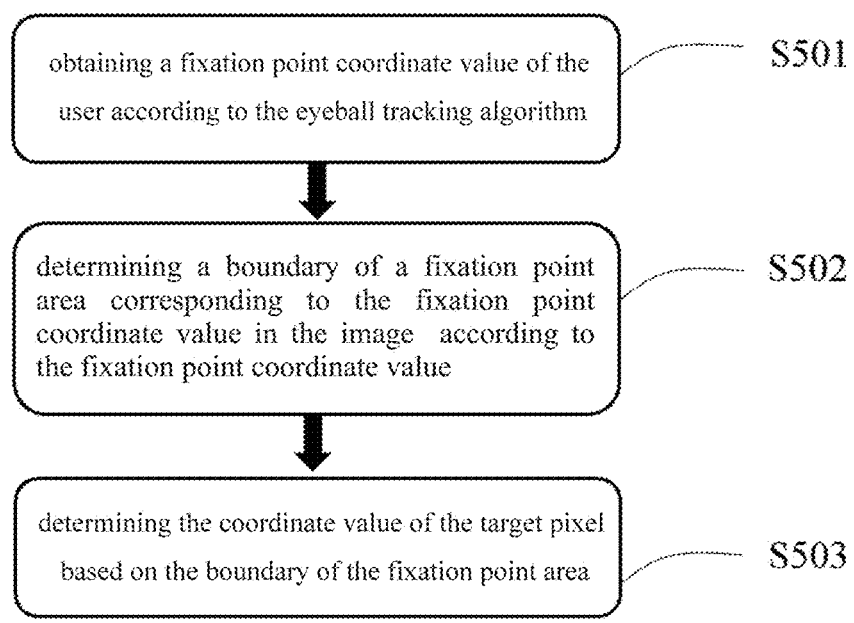
FIG. 5 shows a flow diagram of determining a coordinate value of a target pixel according to an embodiment of the present disclosure.

FIG. 5 shows a flow diagram of determining the coordinate value of the target pixel according to an embodiment of the present disclosure. First, in step S501, the fixation point coordinate value of the user is obtained according to the eyeball tracking algorithm, for example, it may be obtained according to the eyeball tracking algorithm that the fixation point of the user is located at the center of the image, and the coordinate value of the center of the image may be served as the fixation point coordinate value of the user.

Next, in step S502, a boundary of a fixation point area corresponding to the fixation point coordinate value in the image is determined according to the fixation point coordinate value. The fixation point area may be a rectangular area centering at the fixation point. The boundary of the rectangular area is the boundary of the fixation point area.

After that, in step S503, the coordinate value of the target pixel is determined based on the boundary of the fixation point area. For example, four vertexes of the fixation point area of the rectangle may be determined as the target pixel.

For example, when the fixation point of the user is located in the center of the image, it may be determined that the central area of the image is served as the fixation area of the user. As shown in FIG. 3C, the fixation area may be determined as a rectangular area. Furthermore, the image may be divided into nine areas by utilizing the four vertexes of the fixation area of the rectangle. In FIG. 3C, the image on the left is corresponding to left eye image data, and the image on the right is corresponding to right eye image data. For example, the left eye image data may be segmented into number 1-9 image areas, and the right eye image data may be segmented into image number 1'-9' image areas. The system 100 may perform rendering of different resolutions on the segmented image area as shown in FIG. 3C respectively.

For example, by taking the left eye image data in FIG. 3C as an example, the number 5 image area located in the center may have the highest resolution. The resolution of a number 4 image area and a number 6 image area located at the left and right side of the number 5 image area in the vertical direction (i.e., the connection direction of a number 1 image area and a number 7 image area) may be the same as the resolution of the number 5 image area, while the resolution in the horizontal direction (i.e., the connection direction of the number 4 image area and the number 6 image area) may be smaller than the resolution of number 5 image area. For example, it may be a half of the resolution of the number 5 image area (or ⅓, or select any resolution depending on the situation, the present disclosure takes the resolution being reducing to a half as an example). Similarly, the resolution of a number 2 image area and a number 8 image area located in the upper and lower side of the number 5 image area in the horizontal direction may be the same as the resolution of the number 5 image area, and the resolution in the vertical direction may be smaller than the resolution of the number 5 image area, for example, the resolution may be a half of the resolution in the number 5 image area. As for the number 1, 3, 7, and 9 image areas located in the upper left side, upper right side, lower left side and lower right side of the number 5 image area, the image resolution of the above image areas in the horizontal and vertical directions may be smaller than the resolution of the number 5 image area. For example, the image resolution of the number 1, 3, 7, and 9 image areas may be a half of the resolution in the number 5 image area in the horizontal and vertical directions.

After the anti-distortion operation as shown in FIG. 3B and the multi-resolution rendering operation as shown in FIG. 3C, the system 100 generates image data for displaying.

FIG. 3D shows a schematic diagram of a synthetic image including the target pixel coordinate data and the image data to be displayed. In some embodiments, the synthetic image has one row of pixel data more than the image to be displayed (such as the image in FIG. 3C). For example, the image data in FIG. 3C comprises m rows*n columns of pixels, then the synthetic image may comprise image data of (m+1) rows*n columns of pixels. As shown in FIG. 3D, the extra one row of pixels in the synthetic image are used to store the coordinate value of the target pixel, for example, the data of the first row of pixels of the synthetic image comprises first pixel data 301 and first pixel data 302 obtained by performing a mapping operation on the coordinate value of the target pixel. Herein, the first pixel data 301 in the image at the left side of FIG. 3D may be corresponding to being obtained by performing the mapping operation on the coordinate value of the target pixel in the image at the left side of FIG. 3C; the first pixel data 302 in the image at the right side of FIG. 3D may be corresponding to being obtained by performing the mapping operation on the coordinate value of the target pixel in the image at the right side of FIG. 3C. In the synthetic image, image data (for example, the image data as shown in FIG. 3C) for displaying which is generated by the system 100 may be written starting from the second row of pixels.

FIG. 3E shows a schematic diagram of an image displayed in the image display apparatus. Herein, the image display apparatus may read the synthetic image, and analysis the coordinate value of the target pixel and the image data for displaying. Based on the coordinate value of the target pixel, the image display apparatus would determine a plurality of sub-areas in the image to be displayed, and stretch and display images of different resolutions in each sub-area respectively.

FIG. 3F shows a schematic diagram of an image viewed by the user through a display device. Since the display device adopts an optical element to form images, certain distortion would occur to the image data to be displayed after being processed by the optical element. Since the anti-distortion process is performed on the original data image, when the user views the image through the display device, the distortion produced by the optical element of the display device and the effect of the anti-distortion process are neutralized, and the user may view images to which no distortion occurs or small distortion occurs.

By utilizing the image processing method provided in the embodiment of the present disclosure, it may realize simultaneous transmission of the coordinate data of the target pixel and the image data to be displayed, thus increasing efficiency of image transmission, may further realize anti-distortion operation, thereby reducing image deformation when the user is viewing the image, and may perform multi-resolution rendering on the image data, thereby reducing transmission pressure of the image data.

According to another aspect of the present disclosure, there is further provided a computer readable storage medium upon which computer readable instructions are stored, and the image processing method may be performed when the instructions are executed by a computer.

By utilizing the image processing method, the image processing apparatus, and the image processing system provided in the present disclosure, it may realize simultaneous transmission of the coordinate data and the image data and increase efficiency in the image transmission process. In addition, an observing area may be located accurately by utilizing the eyeball tracking algorithm, and only this area is rendered with an emphasis, so that a great quantity of work may be saved. Since hardware receives a limited amount of data, the multi-resolution rendering may reduce data throughput transmitted by PC to a display screen, so that data transmission pressure is reduced.

In order to implement different modules, units and their functions described in the present disclosure, a computer hardware platform may be served as a hardware platform of one or more elements described above. Hardware elements, operation systems and program languages of such kind of computer are common, and it may be assumed that those skilled in the art are familiar with these techniques, and are capable of utilizing the techniques described herein to provide information needed for motion control by utilizing the technique described herein. Once computer including user interface (UI) elements is capable of being used as a personal computer (PC) or other types of work stations or terminal devices, and may also be served as a server for use after being programmed appropriately. It may be considered that those skilled in the art are familiar with such structure and program as well as general operations of this kind of computer device. Therefore, all the figures do not need additional explanations.

Different aspects of the method for providing information required for motion control and/or the method for implementing other steps via a program are summarized. Program parts in the technique may be considered as a "product" or "good" existing in a form of an executable code and/or related data, and are participated or realized by a computer readable medium. Physical and permanent storage medium may comprise memory or storage used by any computer, processor, or similar device or related unit, for example, various semiconductor memories, tape drives, disk drives or any similar device being capable of providing the storing function for software.

The software or a part thereof is likely to communicate via a network sometimes, such as Internet or other communication networks. Such communication can load the software from one computer device or processer to another, for example, loading from one server or host computer of the motion control system to a hardware platform of one computer environment, or other computer environments that implement the system, or a system of a similar function related to the information required for providing motion control. Therefore, another kind of medium being capable of delivering a software element can also be served as physical connection between local devices, for example, optical wave, electric wave, electromagnetic wave, etc., and transmission can be realized via electric cable, optical cable or air and so on. Physical mediums for carrying waves such as electric cable, wireless connection or optical cable and other similar devices can also be considered as a medium of bearing software. As for the usage of the medium, unless it is limited to a "physical" medium, other terms representing a computer or machine "readable medium" represent a medium participating in the process of executing any instruction by the processor, At the same time, the present disclosure uses specific words to describe the embodiment of the present disclosure. For example, "one embodiment", "an embodiment", and/or "some embodiments" intend to a certain feature, structure or characteristics related to at least one embodiment. Therefore, it shall be emphasized and noted that "an embodiment", "one embodiment" or "an alternative embodiment" mentioned for two times or for many times at different positions in the specification may not refer to a same embodiment. In addition, some features, structures or characteristics in one or more embodiments of the present disclosure can be combined appropriately.

Additionally, those skilled in the art can understand that respective aspects of the present disclosure can be explained and described through several types or conditions having patentability, including any combination of new and useful process, machine, product or substance or any new and useful improvement made thereto. Correspondingly, respective aspects of the present disclosure can be executed completely by a hardware, or can be executed completely by a software (including firmware, resident software, microcode, etc.), or can be executed by a combination of the hardware and the software. The above hardware or software can be referred to as "data block", "module", "engineer", "unit", "component" or "system". In addition, respective aspects of the present disclosure may be represented as a computer product located in one or more computer readable media, and the product comprises a computer readable program code.

The computer readable signal medium is likely to include one transmission data signal containing the computer program code, for example, being on a baseband or being served as a part of the carrier. The transmission signal is likely to have a variety of representation forms including electromagnetic form, light form, etc., or an appropriate combination form. The computer readable signal medium can be any computer readable medium other than the computer readable storage medium, and the medium can be connected to one instruction execution system, apparatus or device to realize a program used for communication, broadcasting or transmission. Program code located on the computer readable signal medium can be transmitted via any appropriate medium, including radio, electric cable, fiber optical cable, radio frequency signal, or similar medium, or any combination of the above medium.

Unless otherwise defined, all the terms (including technical and scientific terms) used herein have the same meaning commonly understood by those ordinary skilled in the art. It shall be understood that those terms defined in common dictionaries shall be explained as having meanings consistent with their meanings in the context of relative technology, but shall not be explained as idealized meanings or very formal meanings, unless otherwise explicitly defined herein.

The above are descriptions of the present disclosure, but shall not be deemed as limitations to the present disclosure. Although several exemplary embodiments of the present disclosure are described, it is easy for those skilled in the art to understand that many modifications and amendments can be made to exemplary embodiments without departing from novel teachings and advantages of the present disclosure. Therefore, all these amendments intend to be included within the scope of the present disclosure defined in the Claims. It shall be understood that the above are descriptions of the present disclosure but shall not be deemed as being limited to specific embodiments of the present disclosure. Furthermore, amendments made to the disclosed embodiments and other embodiments intend to be included within the scope of the attached Claims. The present disclosure is defined by the Claims and equivalents thereof.

What is claimed is:

1. An image processing method, including:
   determining a coordinate value of one or more target pixels in an image, wherein the target pixel is used to segment the image;
   performing a mapping operation on the coordinate value of the one or more target pixels to obtain first pixel data;
   obtaining pixel data of the image as second pixel data;
   synthesizing the first pixel data and the second pixel data to obtain a synthetic image, wherein the first pixel data is obtained by:
   determining a transformation parameter used for the mapping operation; and
   as for a coordinate value of each of the one or more target pixels, transforming the coordinate value into a value within a pixel value scope of the image based on the transformation parameter, to obtain the first pixel data.

2. The image processing method according to claim 1, wherein determining a coordinate value of one or more target pixels in an image comprises:
   obtaining a fixation point coordinate value of a user according to an eyeball tracking algorithm;
   determining a boundary of a fixation point area, corresponding to the fixation point coordinate value, in the image; and
   determining the coordinate value of the target pixel based on the boundary of the fixation point area.

3. The image processing method according to claim 1, wherein
   the first pixel data comprises a quotient obtained by dividing the coordinate value by the transformation parameter and a remainder obtained by dividing the coordinate value by the transformation parameter.

4. The image processing method according to claim 3, further comprising:
   using two adjacent pixel values to represent the first pixel data, wherein the two adjacent pixel values comprise a first pixel value and a second pixel value, wherein
   taking the quotient obtained by dividing the coordinate value by the transformation parameter as the first pixel value of the two adjacent pixel values;
   taking the remainder obtained by dividing the coordinate value by the transformation parameter as the second pixel value of the two adjacent pixel values.

5. The image processing method according to claim 4, wherein synthesizing the first pixel data and the second pixel data to obtain a synthetic image comprises:
   establishing a new image;
   writing the first pixel data into the new image;
   writing the second pixel data after the first pixel data;
   taking the new image into which data is written as the synthetic image.

6. The image processing method according to claim 1, further comprising:
   determining optical parameters of a display apparatus used for displaying the image before determining the coordinate value of the one or more target pixels;
   performing an anti-distortion operation on the image based on the optical parameters of the display apparatus.

7. The image processing method according to claim 6, wherein the anti-distortion operation comprises:
   determining an anti-distortion grid according to the optical parameters of the display apparatus;
   generating an anti-distorted image based on the anti-distortion grid.

8. The image processing method according to claim 1, further comprising:
   segmenting the image into a plurality of sub-images based on the coordinate value of one or more target pixels in the image, and adjusting a resolution of at least one sub-image of the plurality of sub-images, so that the resolution of at least one sub-image of the plurality of sub-images is higher than a resolution of other sub-images.

9. The image processing method according to claim 1, further comprising:
   transmitting the synthetic image to a driving unit of the display apparatus, wherein first pixel data in the synthetic image is read by the driving unit, an inverse mapping operation is performed on the first pixel data to obtain the coordinate value of the one or more target pixels, and the coordinate value is used to segment the image into a plurality of sub-images which are drove and displayed respectively.

10. An image processing apparatus, comprising:
    a determining unit, configured to determine a coordinate value of one or more target pixels in an image, wherein the target pixel is used to segment the image;
    a transforming unit, configured to perform a mapping operation on the coordinate value of the one or more target pixels determined by the determining unit to obtain first pixel data;
    an obtaining unit, configured to obtain pixel data of the image as second pixel data; and
    a synthesizing unit, configured to synthesize the first pixel data obtained by the transforming unit and the second pixel data obtained by the obtaining unit to obtain a synthetic image,
    wherein to obtain the first pixel data, the transforming unit is configured to:
    determine a transformation parameter used for the mapping operation; and
    as for each of coordinate values of the one or more target pixels, transform the coordinate value into a value within a pixel value scope of the image based on the transformation parameter, to obtain the first pixel data.

11. The image processing apparatus according to claim 10, wherein the determining unit obtains a fixation point coordinate value of a user according to an eyeball tracking algorithm; determines a boundary of a fixation point area corresponding to the fixation point coordinate value in the image; and determines the coordinate value of the target pixel based on the boundary of the fixation point area.

12. The image processing apparatus according to claim 10, wherein the first pixel data comprises a quotient obtained by dividing coordinate value by the transformation parameter and a remainder obtained by dividing the coordinate value by the transformation parameter.

13. The image processing apparatus according to claim 12, wherein the transforming unit is further configured to use two adjacent pixel values to represent the first pixel data,
wherein the two adjacent pixel values comprise a first pixel value and a second pixel value, wherein
the quotient obtained by dividing the coordinate value by the transformation parameter is taken as the first pixel value of the two adjacent pixel values;
the remainder obtained by dividing the coordinate value by the transformation parameter is taken as the second pixel value of the two adjacent pixel values.

14. The image processing apparatus according to claim 10, wherein the synthesizing unit is configured to establish a new image; write the first pixel data into the new image; write the second pixel data after the first pixel data; and take the new image into which data is written as the synthetic image.

15. The image processing apparatus according to claim 10, further comprising:
an anti-distortion unit, configured to determine optical parameters of a display apparatus used for displaying the image before determining the coordinate value of the one or more target pixels, and perform an anti-distortion operation on the image based on the optical parameters of the display apparatus.

16. The image processing apparatus according to claim 15, wherein the anti-distortion unit is configured to determine an anti-distortion grid according to the optical parameters of the display apparatuses; and generate an anti-distortion image based on the anti-distortion grid.

17. The image processing apparatus according to claim 10, further comprising:
a multi-resolution rendering unit, configured to segment the image into a plurality of sub-images according to the target pixels, and adjust a resolution of at least one sub-image of the plurality of sub-images, so that the resolution of at least one sub-image of the plurality of sub-images is higher than a resolution of other sub-images.

18. The image processing apparatus according to claim 10, further comprising:
a transmitting unit, configured to transmit the synthetic image to a driving unit of the display apparatus, wherein first pixel data in the synthetic image is read by the driving unit, an inverse mapping operation is performed on the first pixel data to obtain the coordinate value of the one or more target pixels, and the coordinate value is used to segment the image into a plurality of sub-images which are drove and displayed respectively.

19. A non-transitory computer readable medium, upon which computer readable instructions are stored, wherein the image processing method according to claim 1 is executed when the computer readable instructions are executed by a computer.

20. An image processing system, comprising:
an image acquisition apparatus, configured to acquire an image;
an image display apparatus comprising a driving unit; and
an image processing apparatus,
wherein, the image processing apparatus includes:
a receiving unit, configured to receive the image from the image acquisition apparatus;
a determining unit, configured to determine a coordinate value of one or more target pixels in the image, wherein the target pixel is used to segment the image;
a transforming unit, configured to perform a mapping operation on the coordinate value of the one or more target pixels to obtain first pixel data;
an obtaining unit, configured to obtain pixel data of the image as second pixel data;
a synthesizing unit, configured to synthesize the first pixel data and the second pixel data to obtain a synthetic image; and
a transmitting unit, configured to transmit the synthetic image to the image display apparatus,
wherein to obtain the first pixel data, the transforming unit is configured to:
determine a transformation parameter used for the mapping operation; and
as for each of coordinate values of the one or more target pixels, transform the coordinate value into a value within a pixel value scope of the image based on the transformation parameter, to obtain the first pixel data,
wherein the first pixel data in the synthetic image is read by the driving unit, an inverse mapping operation is performed on the first pixel data to obtain the coordinate value of the one or more target pixels, and the coordinate value is used to segment the image into a plurality of sub-images which are drove and displayed respectively.

* * * * *